United States Patent
Li et al.

(10) Patent No.: US 9,009,466 B2
(45) Date of Patent: Apr. 14, 2015

(54) TERMINAL DEVICE CAPABLE OF LINK LAYER ENCRYPTION AND DECRYPTION AND DATA PROCESSING METHOD THEREOF

(75) Inventors: Qin Li, Shaanxi (CN); Jun Cao, Shaanxi (CN); Manxia Tie, Shaanxi (CN)

(73) Assignee: China IWNCOMM Co., Ltd. (CN)

( * ) Notice: Subject to any disclaimer, the term of this patent is extended or adjusted under 35 U.S.C. 154(b) by 45 days.

(21) Appl. No.: 13/995,641

(22) PCT Filed: Jun. 17, 2011

(86) PCT No.: PCT/CN2011/075854
§ 371 (c)(1),
(2), (4) Date: Jun. 19, 2013

(87) PCT Pub. No.: WO2012/083652
PCT Pub. Date: Jun. 28, 2012

(65) Prior Publication Data
US 2013/0283045 A1    Oct. 24, 2013

(30) Foreign Application Priority Data
Dec. 20, 2010  (CN) .......................... 2010 1 0596663

(51) Int. Cl.
*H04L 29/06* (2006.01)
*H04L 9/08* (2006.01)

(52) U.S. Cl.
CPC .......... *H04L 63/0428* (2013.01); *H04L 63/162* (2013.01); *H04L 9/08* (2013.01)

(58) Field of Classification Search
CPC ... H04L 63/0428; H04L 63/061; H04L 63/16; H04L 63/162
USPC .......................... 713/153, 151, 150, 171, 162
See application file for complete search history.

(56) References Cited

U.S. PATENT DOCUMENTS 8,271,775 B2 * 9/2012 Shenoy et al. ................ 713/151
2010/0166183 A1   7/2010 Johnston et al.

FOREIGN PATENT DOCUMENTS

| CN | 1342376 A | 3/2002 |
|----|-----------|--------|
| CN | 101043335 A | 9/2007 |
| CN | 101431408 A | 5/2009 |
| CN | 101917272 A | 12/2010 |

* cited by examiner

*Primary Examiner* — Edward Zee
(74) *Attorney, Agent, or Firm* — DLA Piper LLP (US)

(57) ABSTRACT

There are a terminal device capable of link layer encryption and decryption and a data process method thereof, and the terminal device includes a link layer processing module including a control module, a data frame encryption module, a data frame decryption module, a key management module, an algorithm module, a transmission port and a reception port; and the control module is connected with the transmission port through the data frame encryption module, the reception port is connected with the control module through the data frame decryption module, the control module is connected with the key management module, the data frame encryption module is connected with the data frame decryption module through the key management module, and the data frame encryption module is connected with the data frame decryption module through the algorithm module.

12 Claims, 1 Drawing Sheet

TERMINAL DEVICE CAPABLE OF LINK LAYER ENCRYPTION AND DECRYPTION AND DATA PROCESSING METHOD THEREOF

This application is a US National Stage of International Application No. PCT/CN2011/075854, filed on 17 Jun. 2011, designating the United States, and claiming the benefit of Chinese Patent Application No. 201010596663.6, filed with the Chinese Patent Office on Dec. 20, 2010 and entitled "Terminal device capable of link layer encryption and decryption and data processing method thereof", which is hereby incorporated by reference in its entirety.

FIELD OF THE INVENTION

The present invention relates to the field of network security and particularly to a terminal device capable of link layer encryption and decryption and data processing method thereof.

BACKGROUND OF THE INVENTION

A wired local area network is typically a broadcast network in which data sent from a node can be received by any other node. The respective nodes over a network share a channel, and this poses great potential insecurity to the network. An attacker can capture all of data packets over a network simply by accessing the network to listen.

No data security method has been proposed for a Local Area Network (LAN) defined in the existing national standard GB/T 15629.3 (corresponding to the IEEE 802.3 or ISO/IEC 8802-3), and this makes it easy for an attacker to steal key information. A terminal device in compliance with the GB/T 15629.3 (corresponding to the IEEE 802.3 or ISO/IEC 8802-3) is incapable of link layer encryption and decryption, and all of link layer data packets are sent over the network in the form of a plaintext, where the sent information is susceptible to interception, thus resulting in great potential insecurity.

A method of link layer data security with encryption per hop has been proposed for a Local Area Network (LAN) in the IEEE 802.1AE, and this mechanism limits a terminal device to the use of only a key between the terminal device and the closest access switch device to perform encryption and decryption processing on a data frame at the link layer instead of the direct use of a key between the terminal device and another terminal device or another switch device to perform encryption and decryption processing on a data packet at the link layer. This link layer processing scheme of the terminal device supporting the IEEE 802.1AE poses a heavy computing burden on the closest access switch device; since a data frame constructed in this scheme has to be decrypted and then encrypted and then forwarded by each switch device over a link until arrival at a destination terminal device, there is a significant delay in data transmission; and the terminal device supporting the IEEE 802.1AE does not support hybrid network deployment of a general switch device and a switch device supporting the IEEE 802.1AE.

SUMMARY OF THE INVENTION

In order to address the foregoing technical problems in the prior art, embodiments of the invention provides a terminal device capable of link layer encryption and decryption and a data processing method thereof.

An embodiment of the invention provides a terminal device capable of link layer encryption and decryption, wherein the terminal device includes a link layer processing module including a control module, a data frame encryption module, a data frame decryption module, a key management module, an algorithm module, a transmission port and a reception port; and the control module is connected with the transmission port through the data frame encryption module, the reception port is connected with the control module through the data frame decryption module, the control module is connected with the key management module, the data frame encryption module is connected with the data frame decryption module through the key management module, and the data frame encryption module is connected with the data frame decryption module through the algorithm module, and wherein:

the control module is capable of strategy management and control;

the key management module is capable of link layer key management and creates a shared key between the terminal device and another terminal device in a network and/or between the terminal device and a switch device in the network in response to a strategy demand of the control module and is responsible for performing management operations of storage, update or deletion on the key; and the created shared key is pre-shared or negotiated about upon successful identity authentication of the terminal device with the other terminal device or the switch device;

upon reception of user data to be sent, the data frame encryption module interacts with the key management module to obtain a corresponding key and then invokes the algorithm module to thereby encrypt the user data to obtain a cipher-text of the user data, constructs a link layer encrypted data frame and sends the encrypted data frame via the transmission port;

upon reception of a data frame via the reception port, the data frame decryption module interacts with the key management module to obtain a corresponding key and then invokes the algorithm module to thereby decrypt the data frame to obtain plaintext information of user data and submits the plaintext information to a higher layer through the control module; and the algorithm module relates to an encryption and decryption algorithm and/or an integrity check algorithm.

An embodiment of the invention further provides a data processing method of a terminal device capable of link layer encryption and decryption, the method including:

1) when the terminal device sends a link layer encryption protocol data frame, 1.1) a link layer control module of the terminal device receiving user data sent from a higher layer to be sent at the link layer 1.2) the control module selecting a type of link layer encryption protocol and a security processing strategy for use according to a local strategy and sending the selected type of link layer encryption protocol, security processing strategy and information of the user data to a data frame encryption module;

1.3) the data frame encryption module processing the user data according to the corresponding link layer encryption protocol and security processing strategy to determine whether to encrypt the user data and constructing a data frame, Frame A1;

1.4) the data frame encryption module sending the constructed Frame A1 via a transmission port to thereby complete sending the link layer data frame; and 2) when the terminal device receives a link layer encryption protocol data frame, 2.1) the terminal device receiving a data frame, Frame A2, sent to the terminal device through the physical layer and sending the received data frame, Frame A2, to a data frame decryption module via a reception port;

2.2) the data frame decryption module determining a corresponding link layer encryption protocol according to the received data frame, Frame A2;

2.3) the data frame decryption module determining whether user data is a plaintext and parsing Frame A2 according to the corresponding link layer encryption protocol to obtain the user data; and 2.4) the data frame decryption module submitting the obtained plaintext of the user data to the higher layer through the control module to thereby complete receiving the link layer data frame; and wherein the Frame A1 is a data frame sent from the terminal device via the transmission port, and the Frame A2 is a data frame received by the terminal device via the reception port.

The terminal device capable of link layer encryption and decryption according to the embodiment of the invention can maintain a shared key between the terminal device and another terminal device in a network and a key between the terminal device and another switch device and can send a data frame by performing security processing on the data frame directly by the key between the terminal device and the destination terminal device or the key between the terminal device and the other switch device, thus effectively lowering both a computing burden on an access switch device at the shortest distance from the terminal device and a delay in data transmission.

The terminal device capable of link layer encryption and decryption can support both a standard ISO/IEC 8802-3 data frame and data frames in a variety of link layer data encryption protocols including a data frame in the IEEE 802.1AE protocol. Forward compatibility can be achieved together with a support of the variety of link layer data encryption protocols to thereby encrypt and decrypt a data frame at the link layer and improve the security of a network.

DETAILED DESCRIPTION OF THE EMBODIMENTS

Figure 1:
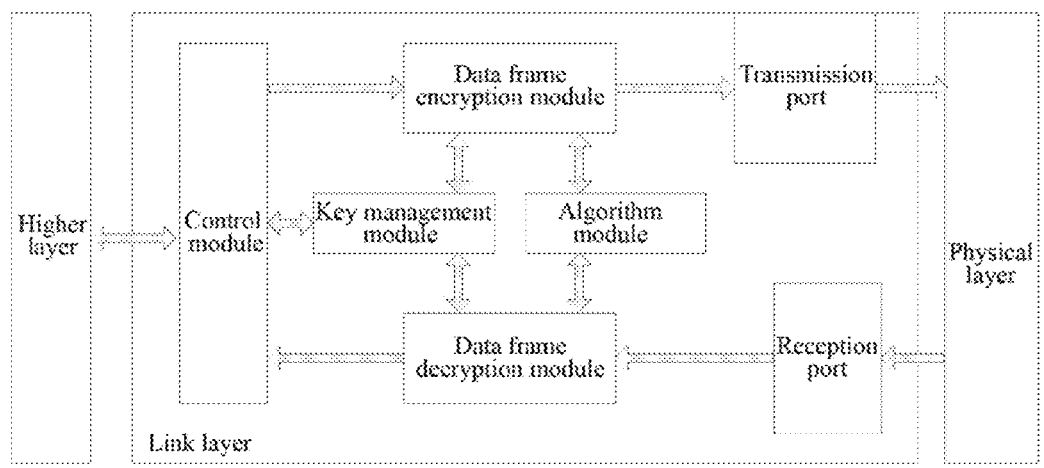
FIG. 1 is a schematic diagram of a terminal device capable of link layer encryption and decryption according to an embodiment of the invention.

Referring to FIG. 1, a terminal device capable of link layer encryption and decryption according to an embodiment of the invention including a link layer processing module including a control module, a data frame encryption module, a data frame decryption module, a key management module, an algorithm module, a transmission port and a reception port, where the control module is connected with the data frame encryption module, the data frame decryption module and the key management module, the data frame encryption module is connected with the transmission port, the data frame decryption module is connected with the reception port, and both the key management module and the algorithm module are connected with the data frame encryption module and the data frame decryption module.

The control module is capable of strategy management and control.

The key management module is capable of link layer key management and creates a shared key between the terminal device and another terminal device in a network and/or between the terminal device and a switch device in the network in response to a strategy demand of the control module and is responsible for performing storage, update, deletion and other management operations on these keys; and the created shared keys can be pre-shared or can be negotiated about upon successful identity authentication of the terminal device with the other terminal device or the switch device.

Upon reception of user data to be sent, the data frame encryption module interacts with the key management module to obtain a corresponding key and then invokes the algorithm module to thereby encrypt the user data to obtain a cipher-text of the user data, constructs a link layer encrypted data frame and sends the encrypted data frame via the transmission port.

Upon reception of a data frame via the reception port, the data frame decryption module interacts with the key management module to obtain a corresponding key and then invokes the algorithm module to thereby decrypt the data frame to obtain plaintext information of user data and submits the plaintext information to a higher layer through the control module.

The algorithm module relates to an encryption and decryption algorithm and/or an integrity check algorithm and can be embodied in hardware or can be embodied in software.

The terminal device capable of link layer encryption and decryption according to the embodiment supports both a standard ISO/IEC 8802-3 data frame and a link layer encryption protocol data frame, where the supported encryption protocol data frame includes a frame header field and a payload field as depicted in Table 1 below:

TABLE 1

| Frame Header | Payload |
| --- | --- |

Particularly the frame header represents frame header information as depicted in Table 2 below:

TABLE 2

| DA | SA | Ethertype | isE | keyIndex |
| --- | --- | --- | --- | --- |

Where:

The DA field represents the identifier of a destination node, the value of which is the MAC address of the destination node;

The SA field represents the identifier of a source node, the value of which is the MAC address of the source node;

The Ethertype field represents an Ethernet-type field, the value thereof is an Ethernet-type field in the link layer encryption protocol to identify the corresponding link layer encryption protocol and frame structure;

The isE field represents an encryption flag bit to identify whether the payload of the data frame is plaintext information or cipher-text information of user data, and this field is regarded by a recipient of the data packet as a criterion to judge whether decryption is required;

The keyIndex field represents the identifier of a key securing (encrypt and/or calculate an integrity check on) the user data, where the key securing the user data can be a key between the terminal device and a switch device or can be a key between the terminal device and a destination terminal device; and The payload field represents a payload of the data frame, which can be either the plaintext information of the user data or the ciphertext information of the user data, where when the isE field indicates encrypted, the payload is the cipher-text information of the user data; and when the isE field indicates no encryption, the payload is the plaintext information of the user data.

In the embodiment of the invention, the respective fields of the data frame will be described as "frame name.field name". For example, the DA field of Frame A1 is denoted by Frame A1.DA, and the payload field of Frame A2 is denoted by Frame A2.Payload.

The value of the SA field in the data frame sent from the terminal device according to the embodiment of the invention to a network through the data frame encryption module via the transmission port is the MAC address of the terminal device; and the value of the DA field in the data frame sent from the terminal device according to the embodiment of the invention to the data frame decryption module through the reception port is the MAC address of the terminal device.

The data frame sent from the terminal device according to the embodiment of the invention via the transmission port is denoted by Frame A1; and the data frame received by the terminal device according to the embodiment of the invention via the reception port is denoted by Frame A2.

If the payload field in the data frame, Frame A1, sent from the terminal device according to the embodiment of the invention is the cipher-text information of the user data, then the key used to construct Frame A1 is denoted by Key1; and if the payload field in the data frame, Frame A2, received from the terminal device according to the embodiment of the invention is the cipher-text information of the user data, then the key to parse Frame A2 is denoted by Key2.

The terminal device capable of link layer encryption and decryption according to the embodiment of the invention operates as follows to send the link layer encryption protocol data frame:

1.1) The higher layer sends, to the link layer control module of the terminal device, the user data to be sent at the link layer;

1.2) The control module selects a type of link layer encryption protocol and a security processing strategy for use according to a local strategy and sends the selected type of link layer encryption protocol, security processing strategy and information of the user data to the data frame encryption module;

1.3) The data frame encryption module processes the user data and constructs Frame A1 according to the corresponding link layer encryption protocol and security processing strategy, where:

The data frame encryption module constructs Frame A1 as follows upon determining that the user data is not required to be encrypted according to the corresponding link layer encryption protocol and security processing strategy:

The value of the Frame A1.DA field is the MAC address of a destination node;

The value of the Frame A1.SA field is the MAC address of the terminal device;

The value of the Frame A1.Ethertype field is an Ethernet type field value in the corresponding link layer encryption protocol;

The value of the Frame A1.isE field is No Encryption;

The value of the Frame A1.keyIndex field is not defined (this field is null when the user data is not encrypted); and The value of the Frame A1.Payload field is the user data; and The data frame encryption module performs the following steps upon determining that the user data is required to be encrypted according to the corresponding link layer encryption protocol and security processing strategy:

1.3.1.1) The data frame encryption module invokes the key management module to obtain the key, KEY1, to encrypt the user data and the identifier keyIndex1 of the key, KEY1;

1.3.1.2) The data frame encryption module invokes the algorithm module to encrypt the user data by the obtained key, KEY1, to obtain the cipher-text of the user data; and 1.3.1.3) The data frame encryption module constructs Frame A1 as follows:

The value of the Frame A1.DA field is the MAC address of the destination node;

The value of the Frame A1.SA field is the MAC address of the terminal device;

The value of the Frame A1.Ethertype field is the Ethernet type field value in the corresponding link layer encryption protocol;

The value of the Frame A1.isE field is Encrypted;

The value of the Frame A1.keyIndex field is the identifier keyIndex1 of the key, KEY1; and The value of the Frame A1.Payload field is the cipher-text of the user data; and 1.4) The data frame encryption module sends constructed Frame A1 via the transmission port to thereby complete sending the link layer data frame.

The terminal device capable of link layer encryption and decryption according to the embodiment of the invention operates as follows to receive the link layer encryption protocol data frame:

2.1) The terminal device receives the data frame, Frame A2, sent to the terminal device through the physical layer and sends the received data frame, Frame A2, to the data frame decryption module via the reception port;

2.2) The data frame decryption module determines the corresponding link layer encryption protocol according to the received data frame, Frame A2;

2.3) The data frame decryption module parses Frame A2 according to the corresponding link layer encryption protocol to obtain the user data, where:

The data frame decryption module extracts the Frame A2.Payload field, i.e., the plaintext of the user data to thereby complete parsing Frame A2 upon determining that the Frame A2.Payload field is the plaintext of the user data according to the Frame A2.isE field;

The data frame decryption module performs the following steps upon determining that the Frame A2.Payload field is the cipher-text of the user data according to the Frame A2.isE field:

2.3.1.1) The data frame decryption module submits information of the Frame A2.keyIndex field to the key management module and retrieves the key, KEY2, to decrypt Frame A2.Payload; and 2.3.1.2) The data frame decryption module invokes the algorithm module to decrypt Frame A2.Payload by the retrieved key, KEY2, to obtain the plaintext of the user data to thereby complete parsing Frame A2; and 2.4) The data frame decryption module submits the obtained plaintext of the user data to the higher layer through the control module to thereby complete receiving the link layer data frame.

The link layer encryption protocol data frame supported by the terminal device according to the embodiment of the invention can further include an integrity check MIC field in addition to the frame header, Frame Header, and the payload, Payload, where the MIC field is an integrity check value calculated on all or a part of the other fields in the link layer encryption protocol data frame (e.g., Frame A1, Frame A2, etc.) than the MIC field.

In an implementation of the supported link layer encryption protocol data frame including the MIC field, the key securing the data frame (e.g., KEY1, KEY2, etc.) includes two parts which are an integrity check key and an encryption key, where the integrity check key is used to calculate or verify the MIC field, and the encryption key part is used to encrypt the user data or decrypt the cipher-text of the user data. In the implementation of the supported link layer encryption protocol data frame including the MIC field, a particular implementation of the step 1.3) when the terminal device according to the embodiment of the invention described above sends the data frame is as follows:

The data frame encryption module performs the following steps upon determining that the user data is not required to be encrypted according to the corresponding link layer encryption protocol and security processing strategy:

1.3.2.1) The data frame encryption module invokes the key management module to obtain the key, KEY1, to secure the data frame and the identifier keyIndex1 of the key, KEY1;

1.3.2.2) The data frame encryption module constructs the other fields of Frame A1 than the Frame A1.MIC field as follows:

The value of the Frame A1.DA field is the MAC address of the destination node;

The value of the Frame A1.SA field is the MAC address of the terminal device;

The value of the Frame A1.Ethertype field is the Ethernet type field value in the corresponding link layer encryption protocol;

The value of the Frame A1.isE field is No Encryption;

The value of the Frame A1.keyIndex field is the identifier keyIndex1 of the key, KEY1; and The value of the Frame A1.Payload field is the user data; and 1.3.2.3) The data frame encryption module invokes the corresponding algorithm module to calculate the value of the Frame A1.MIC field on constructed Frame A1 other than the Frame A1.MIC field by using the integrity check key of KEY1 to thereby complete constructing Frame A1; and The data frame encryption module performs the following steps upon determining that the user data is required to be encrypted according to the corresponding link layer encryption protocol and security processing strategy:

1.3.3.1) The data frame encryption module invokes the key management module to obtain the key, KEY1, to secure the user data and the identifier keyIndex1 of the key, KEY1;

1.3.3.2) The data frame encryption module invokes the algorithm module to encrypt the user data by the obtained key, KEY1, to obtain the cipher-text of the user data; and 1.3.3.3) The data frame encryption module constructs Frame A1 other than the Frame A1.MIC field as follows:

The value of the Frame A1.DA field is the MAC address of the destination node;

The value of the Frame A1.SA field is the MAC address of the terminal device;

The value of the Frame A1.Ethertype field is the Ethernet type field value in the corresponding link layer encryption protocol;

The value of the Frame A1.isE field is Encrypted;

The value of the Frame A1.keyIndex field is the identifier keyIndex1 of the key, KEY1; and The value of the Frame A1.Payload field is the cipher-text of the user data; and 1.3.3.4) The data frame encryption module invokes the corresponding algorithm module to calculate the value of the Frame A1.MIC field on constructed Frame A1 other than the Frame A1.MIC field by using the integrity check key of KEY1 to thereby complete constructing Frame A1.

In the implementation of the supported link layer encryption protocol data frame including the MIC field, a particular implementation of the step 2.3) when the terminal device according to the embodiment of the invention described above receives the data frame is as follows:

The data frame decryption process performs the following steps upon determining that the Frame A2.Payload field is the plaintext of the user data according to the Frame A2.isE field:

2.3.2.1) The data frame decryption module submits the information of the Frame A2.keyIndex field to the key management module and retrieves the key, KEY2, securing Frame A2; and 2.3.2.2) The data frame decryption module invokes the algorithm module to verify the Frame A2.MIC field in Frame A2 for correctness by the integrity check key of the retrieved key, KEY2; and if Frame A2.MIC is correct, then it proceeds to the step 2.3.1.3); otherwise, it discards the packet; and 2.3.2.3) The data frame decryption module extracts the Frame A2.Payload field as the plaintext of the user data to thereby complete parsing Frame A2; and The data frame decryption module performs the following steps upon determining that the Frame A2.Payload field is the cipher-text of the user data according to the Frame A2.isE field:

2.3.3.1) The data frame decryption module submits the information of the Frame A2.keyIndex field to the key management module and retrieves the key, KEY2, securing Frame A2; and 2.3.3.2) The data frame decryption module invokes the algorithm module to verify the Frame A2.MIC field in Frame A2 for correctness by the integrity check key of the retrieved key, KEY2; and if Frame A2.MIC is correct, then it proceeds to the step 2.3.2.3); otherwise, it discards the packet; and 2.3.3.3) The data frame decryption module invokes the algorithm module to decrypt Frame A2.Payload by the encryption key of the obtained key, KEY2, to obtain the plaintext of the user data to thereby complete parsing Frame A2.

In the implementation in which the terminal device supports the link layer encryption protocol data frame including the MIC field, the terminal device according to the invention can secure the user data in a particular implementation through encryption and integrity checking so that in the step 1.3), the data frame encryption module firstly encrypts the user data to construct the payload field of the data frame and then performs integrity checking on the data frame to construct the MIC field; and in this implementation, in the step 2.3), the data frame decryption module firstly verifies the MIC field for correctness and then decrypts the payload field of the data frame to obtain and submit to the higher layer the plaintext information of the user data only upon determining that the MIC field is correct.

In the implementation in which the terminal device supports the link layer encryption protocol data frame including the MIC field, the terminal device according to the invention can alternatively secure the user data in a particular implementation through encryption and integrity checking so that in the step 1.3), the data frame encryption module firstly calculates an integrity check on the data frame with the plaintext of the user data being the payload field to construct the MIC field and then encrypts the plaintext of the user data and updates the payload field of the data frame with the obtained cipher-text of the user data; and in this implementation, in the step 2.3), the data frame decryption module firstly decrypts the payload field of the data frame to obtain the plaintext information of the user data; and then verifies the MIC field for correctness and can submit to the higher layer the previously decryption-obtained plaintext information of the user data which is validated only upon determining that the MIC field is correct.

A key between one terminal device and another is denoted by an inter-station key.

Figure 2:
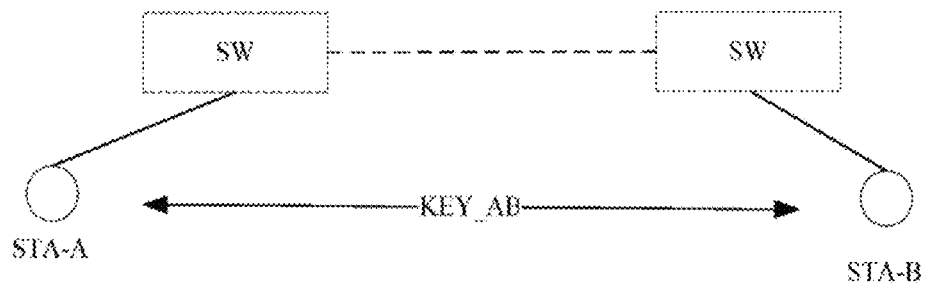
FIG. 2 is a schematic diagram of an implementation in which an inter-station key is used according to an embodiment of the invention.

In a particular implementation of any of the embodiments mentioned above, the terminal device can perform link layer secured transmission by an inter-station key between the terminal device STA-A and the terminal device STA-B. As illustrated in FIG. 2, the terminal device STA-A can send a data frame to the terminal device STA-B simply by securing (encrypting and/or calculating an integrity check on) the data frame to be sent by the inter-station key KEY_AB between the terminal device STA-A and the terminal device STA-B regardless of whatever link between the terminal device STA-A and the terminal device STA-B; and The terminal device STA-B can receive the data frame from the terminal device STA-A simply by de-securing (decrypting and/or calculating an integrity check on) the received data frame by the inter-station key KEY_AB between the terminal device STA-A and the terminal device STA-B regardless of whatever link between the terminal device STA-A and the terminal device STA-B.

In the implementation in which the inter-station key is used, a switch device between the terminal device STA-A and the terminal device STA-B can forward the data frame between them directly without encryption or decryption.

In the implementation in which the inter-station key is used, a switch device between the terminal device STA-A and the terminal device STA-B may or may not be capable of link layer encryption and decryption, that is, hybrid network deployment of a switch device capable of link layer encryption and decryption and a switch device incapable of link layer encryption and decryption is supported in the implementation in which the inter-station key is used.

Furthermore the frame header in the link layer encryption protocol data frame supported by the UE according to the embodiment of the invention can further include a MAClist field to represent information of a list of specific MAC addresses, where switch devices in the list of specific MAC addresses given in the field will encrypt and decrypt a cipher-text of a received data frame, and all of switch devices absent in the list of specific MAC addresses other than a destination node will simply forward the cipher-text of the data frame directly. The presence of the MAClist field can dispense with the necessity of the switch devices to operate to decrypt and then encrypt and then forward all of data frames to be forwarded.

Figure 3:
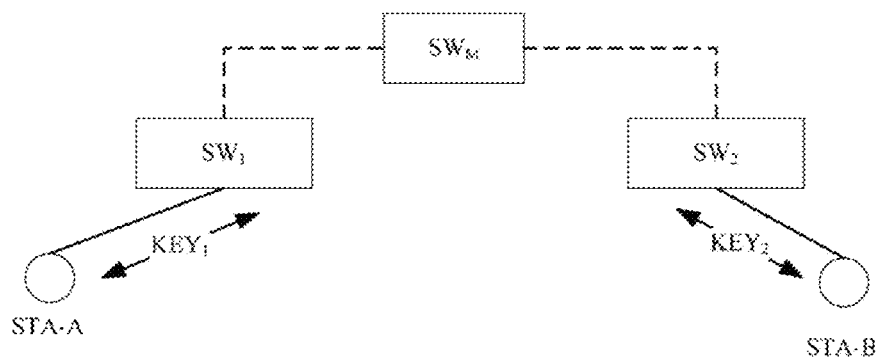
FIG. 3 is a schematic diagram of an implementation of a MAClist field according to an embodiment of the invention.

As illustrated in FIG. 3, in a particular implementation, the MAClist field can be defined as a list of MAC addresses of the first switch device capable of link layer encryption and decryption and the last switch device capable of link layer encryption and decryption over a link from a sending terminal device to a destination terminal device.

When the terminal device STA-A sends the data frame to the terminal device STA-B, the MAClist field includes the MAC addresses of a switch device $SW_1$ and a switch device $SW_2$, and the data frame sent from the terminal device STA-A to the terminal device STA-B will be decrypted and then encrypted and then forwarded only by the switch device $SW_2$ and the switch device $SW_2$ but can simply be forwarded directly other switch devices (e.g., another switch device $SW_M$ located over a link of the terminal device STA-A to the terminal device STA-B);

After obtaining information of the MAC addresses of the switch device $SW_1$ and the switch device $SW_2$, the terminal device STA-A which is the sending terminal device constructs the data frame to send the MAC addresses of $SW_1$ and $SW_2$ as the MAClist field, to encrypt the user data and calculate the MIC field in the sent data frame by a key, $KEY_1$, between the terminal device STA-A and the switch device $SW_1$, and to send the keyIndex field of the data frame assigned with $keyIndex_1$ of $KEY_1$; and The terminal device STA-B which is the destination terminal device processes the data frame by a key, KEY2, between the terminal device STA-B and the switch device $SW_2$ upon reception of the data frame sent from the terminal device STA-A.

In the foregoing implementation with the MAClist field, in the course of transmitting the data frame from the terminal device STA-A to the terminal device STA-B, the switch device $SW_1$ decrypts the user data by the key, $KEY_1$, identified by keyIndex upon reception of the data frame sent from the terminal device STA-A to the terminal device STA-B; and the switch device $SW_2$ encrypts the user data by the key, $KEY_2$, between the switch device $SW_2$ and the terminal device STA-B and updates the keyIndex field in the data frame to be sent with keyIndex2 of $KEY_2$ upon reception of the data frame sent from the terminal device STA-A to STA-B, where the data frame can be plaintext-transmitted as a between the switch device $SW_1$ and the switch device $SW_2$ or can be encrypted by the key between the switch device $SW_1$ and the switch device $SW_2$ for transmission, and the embodiment of the invention will not be limited in this regard.

In the foregoing implementation with the MAClist field, one or more switch devices incapable of link layer encryption and decryption may exist between the terminal device STA-A and $SW_1$, between $SW_1$ and $SW_2$, and between $SW_1$ and the terminal device STA-B; and also one or more switch devices capable of link layer encryption and decryption may exist between $SW_1$ and $SW_2$, that is, the terminal device according to the invention supports hybrid network deployment of a switch device capable of link layer encryption and decryption and a switch device incapable of link layer encryption and decryption in the foregoing implementation with the MAClist field.

The invention claimed is:

1. A terminal device configured to perform link layer encryption and decryption, wherein the terminal device comprises a link layer processing module comprising a control module, a data frame encryption module, a data frame decryption module, a key management module, an algorithm module, a transmission port and a reception port; and the control module is connected with the transmission port through the data frame encryption module, the reception port is connected with the control module through the data frame decryption module, the control module is connected with the key management module, the data frame encryption module is connected with the data frame decryption module through the key management module, and the data frame encryption module is connected with the data frame decryption module through the algorithm module, and wherein:

the control module is configured to perform strategy management and control;

the key management module is configured to perform link layer key management and creates a shared key between the terminal device and another terminal device in a network and/or between the terminal device and a switch device in the network in response to a strategy demand of the control module and is responsible for performing management operations of storage, update or deletion on key; and the created shared key is pre-shared or negotiated about upon successful identity authentication of the terminal device with the another terminal device or the switch device;

upon reception of a first user data to be sent, the data frame encryption module interacts with the key management module to obtain a corresponding key and then invokes the algorithm module to thereby encrypt the first user data to obtain a cipher-text of the first user data, constructs a link layer encrypted data frame and sends the link layer encrypted data frame via the transmission port;

upon reception of a data frame via the reception port, the data frame decryption module interacts with the key management module to obtain a corresponding key and then invokes the algorithm module to thereby decrypt the data frame to obtain plaintext information of a second user data and submits the plaintext information to a higher layer through the control module; and the algorithm module relates to an encryption algorithm and/or an integrity check algorithm, wherein the terminal device further comprises a transmitter configured to transmit signals corresponding to the link layer encrypted data frame received from the transmission port, and a receiver configured to receive signals corresponding to the data frame to be provided to the reception port.

2. A data processing method of a terminal device configured to perform link layer encryption and decryption, wherein the method comprises:
1) when the terminal device sends a link layer encryption protocol data frame,
1.1) a link layer control module of the terminal device receiving a first user data sent from a higher layer to be sent at the link layer
1.2) the control module selecting a type of link layer encryption protocol and a security processing strategy for use according to a local strategy and sending the selected type of link layer encryption protocol, security processing strategy and information of the first user data to a data frame encryption module;
1.3) the data frame encryption module processing the first user data according to the selected type of link layer encryption protocol and security processing strategy to determine whether to encrypt the first user data and constructing a data frame, Frame A1;
1.4) the data frame encryption module sending the constructed Frame A1 via a transmission port to thereby complete sending the link layer encryption protocol data frame; and
2) when the terminal device receives a link layer encryption protocol data frame,
2.1) the terminal device receiving a data frame, Frame A2, sent to the terminal device through a physical layer and sending the received Frame A2 to a data frame decryption module via a reception port;
2.2) the data frame decryption module determining a corresponding link layer encryption protocol according to the received Frame A2;
2.3) the data frame decryption module determining whether a second user data is a plaintext and parsing the Frame A2 according to the corresponding link layer encryption protocol to obtain the second user data; and
2.4) the data frame decryption module submitting the plaintext of the obtained second user data to the higher layer through the control module to thereby complete receiving the link layer encryption protocol data frame; and
wherein the Frame A1 is a data frame sent from the terminal device via the transmission port, and the Frame A2 is a data frame received by the terminal device via the reception port.

3. The data processing method of the terminal device configured to perform link layer encryption and decryption according to claim 2, wherein the method supports a standard ISO/IEC 8802-3 data frame or a link layer encryption protocol data frame, and the supported encryption protocol data frame includes a frame header field and a payload field; and
the frame header field represents frame header information and comprises a DA field, an SA field, an Ethertype field, an isE field and a keyIndex field, wherein:
the DA field represents an identifier of a destination node, a value of which is MAC address of the destination node;
the SA field represents the identifier of a source node, the value of which is the MAC address of the source node;
the Ethertype field represents an Ethernet-type field, the value of which is an Ethernet-type field in the selected type of link layer encryption protocol to identify the corresponding link layer encryption protocol and frame structure;
the isE field represents an encryption flag bit to identify whether the payload of the data frame is plaintext information or cipher-text information of the first user data or the second user data, and this field is used by a recipient of the data packet as a criterion to judge whether decryption is required;
the keyIndex field represents the identifier of a key securing the first user data or the second user data, wherein the first user data or the second user data is secured by encryption and/or calculating an integrity check, and the key securing the first user data or the second user data is a key between the terminal device and a switch device or a key between the terminal device and a destination terminal device; and
the payload field represents a payload of the data frame, which is either a plaintext information of the first user data or the second user data or a ciphertext information of the first user data or the second user data, wherein when the isE field indicates encrypted, the payload is the ciphertext information of the first user data or the second user data; and when the isE field indicates no encryption, the payload is the plaintext information of the first user data or the second user data.

4. The data processing method of the terminal device configured to perform link layer encryption and decryption according to claim 3, wherein:
when the data frame encryption module determines that the first user data is not required to be encrypted according to the corresponding link layer encryption protocol and security processing strategy, step 1.3) comprises:
the data frame encryption module constructing the Frame A1 with each field taking the following value:
the value of the Frame A1.DA field is the MAC address of a destination node;
the value of the Frame A1.SA field is the MAC address of the terminal device;

the value of the Frame A1.Ethertype field is an Ethernet type field value in the corresponding link layer encryption protocol;
the value of the Frame A1.isE field is No Encryption;
the value of the Frame A1.keyIndex field is not defined (this field is null when the first user data is not encrypted); and
the value of the Frame A1.Payload field is the first user data; and
when the data frame encryption module determines the first user data is required to be encrypted according to the corresponding link layer encryption protocol and security processing strategy, the step 1.3) comprises:
1.3.1.1) the data frame encryption module invoking a key management module to obtain a key, KEY1, to encrypt the first user data and the identifier keyIndex1 of the key, KEY1;
1.3.1.2) the data frame encryption module invoking an algorithm module to encrypt the first user data by the obtained KEY1 to obtain a cipher-text of the first user data; and
1.3.1.3) the data frame encryption module constructing the Frame A1 with each field taking the following value:
the value of the Frame A1.DA field is the MAC address of the destination node;
the value of the Frame A1.SA field is the MAC address of the terminal device;
the value of the Frame A1.Ethertype field is the Ethernet type field value in the corresponding link layer encryption protocol;
the value of the Frame A1.isE field is Encrypted;
the value of the Frame A1.keyIndex field is the identifier keyIndex1 of the KEY1; and
the value of the Frame A1.Payload field is the cipher-text of the first user data; and
the KEY1 presents a key used to construct the Frame A1 sent from the terminal device when the payload field in the Frame A1 is cipher-text information of the first user data.

5. The data processing method of the terminal device configured to perform link layer encryption and decryption according to claim 3, wherein:
when the data frame decryption module determines that the Frame A2.Payload field is a plaintext of the second user data according to the Frame A2.isE field, step 2.3) comprises: extracting the Frame A2.Payload field to thereby complete parsing the Frame A2; and
when the data frame decryption module determines that the Frame A2.Payload field is a cipher-text of the second user data according to the Frame A2.isE field, the step 2.3) comprises:
2.3.1.1) the data frame decryption module sending information of the Frame A2.keyIndex field to a key management module and retrieving a key, KEY2, to decrypt Frame A2.Payload; and
2.3.1.2) the data frame decryption module invoking an algorithm module to decrypt Frame A2.Payload by the retrieved KEY2 to obtain the plaintext of the second user data to thereby complete parsing Frame A2 and obtain the second user data; and
KEY2 presents a key used to parse the Frame A2 received by the terminal device when the payload field in the Frame A2 is cipher-text information of the second user data.

6. The data processing method of the terminal device configured to perform link layer encryption and decryption according to claim 3, wherein the link layer encryption protocol data frame supported by the method further comprises an integrity check MIC field, and the MIC field is an integrity check value calculated on all or a part of other fields in the link layer encryption protocol data frame than the MIC field, and the key securing the data frame comprises two parts which are an integrity check key and an encryption key, wherein the integrity check key is used to calculate or verify the MIC field, and the encryption key part is used to encrypt the first user data or decrypt a cipher-text of the second user data.

7. The data processing method of the terminal device configured to perform link layer encryption and decryption according to claim 6, wherein
when the data frame encryption module determines that the first user data is not required to be encrypted according to the corresponding link layer encryption protocol and security processing strategy, step 1.3) comprises
1.3.2.1) the data frame encryption module invoking a key management module to obtain a key, KEY1, to secure the data frame and the identifier keyIndex1 of the key, KEY1;
1.3.2.2) the data frame encryption module constructing all the other fields of the Frame A1 than the Frame A1.MIC field, wherein each of the other fields of the Frame A1 than Frame A1.MIC take the following value:
the value of the Frame A1.DA field is the MAC address of a destination node;
the value of the Frame A1.SA field is the MAC address of the terminal device;
the value of the Frame A1.Ethertype field is an Ethernet type field value in the corresponding link layer encryption protocol;
the value of the Frame A1.isE field is No Encryption;
the value of the Frame A1.keyIndex field is the identifier keyIndex1 of the KEY1; and
the value of the Frame A1.Payload field is the first user data; and
1.3.2.3) the data frame encryption module invoking a corresponding algorithm module to calculate the value of the Frame A1.MIC field on constructed Frame A1 other than the integrity check Frame A1.MIC field using the integrity check key of KEY1 to thereby complete constructing Frame A1; and
when the data frame encryption module determines that the first user data is required to be encrypted according to the corresponding link layer encryption protocol and security processing strategy, the step 1.3) comprises:
1.3.3.1) the data frame encryption module invoking the key management module to obtain the KEY1 to secure the first user data and the identifier keyIndex1 of the KEY1;
1.3.3.2) the data frame encryption module invoking the algorithm module to encrypt the first user data by the obtained KEY1 to obtain a cipher-text of the first user data; and
1.3.3.3) the data frame encryption module constructing each filed of the Frame A1 other than the Frame A1.MIC field, wherein each field of the Frame A1 other than Frame A1.MIC take the following value:
the value of the Frame A1.DA field is the MAC address of the destination node;
the value of the Frame A1.SA field is the MAC address of the terminal device;
the value of the Frame A1.Ethertype field is the Ethernet type field value in the corresponding link layer encryption protocol;
the value of the Frame A1.isE field is Encrypted;
the value of the Frame A1.keyIndex field is the identifier keyIndex1 of the Key1; and the value of the Frame A1.Payload field is the cipher-text of the first user data; and 1.3.3.4) the data frame encryption module invoking the corresponding algorithm module to calculate the value of the integrity check Frame A1.MIC field on the constructed Frame A1 other than the Frame A1.MIC field using the integrity check key of KEY1 to thereby complete constructing Frame A1.

8. The data processing method of the terminal device configured to perform link layer encryption and decryption according to claim 6, wherein:

when the data frame decryption module determines that the Frame A2.Payload field is a plaintext of the second user data according to the Frame A2.isE field, the step 2.3) comprises:

2.3.2.1) the data frame decryption module submitting information of the Frame A2.keyIndex field to a key management module and retrieving a key, KEY2, to de-secure the Frame A2; and 2.3.2.2) the data frame decryption module invoking an algorithm module to verify the Frame A2.MIC field in the Frame A2 for correctness by the integrity check key of the retrieved KEY2; and if Frame A2.MIC is correct, then proceeding to the step 2.3.2.3); otherwise, discarding the packet; and 2.3.2.3) the data frame decryption module extracting the Frame A2.Payload field as a plaintext of the second user data to thereby complete parsing the data frame, Frame A2; and when the data frame decryption module determines that the Frame A2.Payload field is a cipher-text of the second user data according to the Frame A2.isE field, the step 2.3) comprises:

2.3.3.1) the data frame decryption module submitting the information of the Frame A2.keyIndex field to the key management module and retrieving the KEY2 to de-secure the Frame A2; and 2.3.3.2) the data frame decryption module invoking the algorithm module to verify the Frame A2.MIC field in the Frame A2 for correctness by the integrity check key of the retrieved KEY2; and if Frame A2.MIC is correct, then proceeding to the step 2.3.3.3); otherwise, discarding the packet; and 2.3.3.3) the data frame decryption module invoking the algorithm module to decrypt Frame A2.Payload by the encryption key of the obtained KEY2 to obtain the plaintext of the second user data to thereby complete parsing Frame A2.

9. The data processing method of the terminal device configured to perform link layer encryption and decryption according to claim 6, wherein when the terminal device secures the first user data through encryption and integrity checking, if in step 1.3), the data frame encryption module firstly encrypts the first user data to construct the payload field of the data frame and then performs integrity checking on the data frame to construct the MIC field, then in step 2.3), upon reception of the data frame, the data frame decryption module firstly verifies the MIC field for correctness and then decrypts the payload field of the data frame to obtain and submit to the higher layer plaintext information of the second user data only upon determining that the MIC field is correct; and when the terminal device secures the first user data through encryption and integrity checking, if in the step 1.3), the data frame encryption module firstly calculates an integrity check on the data frame with a plaintext of the first user data being the payload field to construct the MIC field and then encrypts the plaintext of the first user data and updates the payload field of the data frame with an obtained cipher-text of the first user data, then in the step 2.3), the data frame decryption module firstly decrypts the payload field of the data frame to obtain plaintext information of the second user data; and then verifies the MIC field for correctness and submits to the higher layer the plaintext information of the second user data previously obtained by decryption which is validated only upon determining that the MIC field is correct.

10. The data processing method of the terminal device configured to perform link layer encryption and decryption according to claim 2, wherein when both Frame A1.KeyIndex and Frame A2.KeyIndex in steps 1.3 and 2.3) indicate inter-station key between a terminal device capable of configured to perform link layer encryption and decryption and an opposite terminal device, the terminal device capable of configured to perform link layer encryption and decryption sends a data frame to the opposite terminal device by securing the data frame to be sent through encryption and/or calculating an integrity check by the inter-station key between the terminal device configured to perform link layer encryption and decryption and the opposite terminal device; and the terminal device configured to perform link layer encryption and decryption receives a data frame from the opposite terminal device by de-securing the received data frame through decryption and/or verifying an integrity check by the inter-station key between the terminal device configured to perform link layer encryption and decryption and the opposite terminal device.

11. The data processing method of the terminal device configured to perform link layer encryption and decryption according to claim 2, wherein the frame header in the link layer encryption protocol data frame supported by the method further comprises a MAClist field to represent information of a list of specific MAC addresses, and switch devices in the list of specific MAC addresses given in the MAClist field are required to decrypt, encrypt and forward a cipher-text of a received data frame, and all of switch devices absent in the list of specific MAC addresses other than a destination node are required to simply forward the cipher-text of the data frame directly.

12. The data processing method of the terminal device configured to perform link layer encryption and decryption according to claim 11, wherein the MAClist field defines a list of MAC addresses of the first switch device configured to perform link layer encryption and decryption and the last switch device configured to perform link layer encryption and decryption over a link from a source terminal device to a destination terminal device; and in step 1.3), the terminal device configured to perform link layer encryption and decryption is the sending terminal device, and the opposite terminal device is the destination terminal device; and after obtaining information of the MAC addresses of the first switch device $SW_1$ configured to perform link layer encryption and decryption and the last switch device $SW_2$ configured to perform link layer encryption and decryption over the link from the terminal device configured to perform link layer encryption and decryption to the opposite terminal device, the terminal device configured to perform link layer encryption and decryption constructs the data frame to include the MAC addresses of $SW_1$ and $SW_2$ in the MAClist field, to secure the data frame by a key between the sending terminal device and the first switch device configured to perform link layer encryption and decryption over the link from the sending terminal device to the destination terminal device, that is, to secure the data frame by a key, $KEY_1$, between the terminal device configured to perform link layer encryption and decryption and $SW_1$, and to send the keyIndex field of the data frame assigned with $keyIndex_1$ of $KEY_1$, wherein the data frame is secured through encryption and/or calculating an integrity check; and in step 2.3), the terminal device configured to perform link layer encryption and decryption is the destination terminal device, and the opposite terminal device is the sending terminal device; and upon reception of a data frame sent from the opposite terminal device, the terminal device configured to perform link layer encryption and decryption extracts the MAClist field to obtain information of the MAC address of the last switch device configured to perform link layer encryption and decryption over the link from the sending terminal device to the destination terminal device and de-secures the data frame by a key between the terminal device and the this switch device, that is, the terminal device configured to perform link layer encryption and decryption extracts the MAClist field to obtain the information of the MAC address of $SW_1$ and de-secures the data frame by a key, $KEY_1$, between the terminal device and $SW_1$ to obtain plaintext information of the second user data, wherein the data frame is de-secured through decryption and/or verifying an integrity check.

* * * * *